United States Patent [19]
Bito et al.

[11] Patent Number: 5,474,861
[45] Date of Patent: Dec. 12, 1995

[54] ELECTRODE FOR NON-AQUEOUS ELECTROLYTE SECONDARY BATTERY

[75] Inventors: Yasuhiko Bito, Minamikawachi; Hiroyuki Murai; Masaki Hasegawa, both of Hirakata; Shuji Ito, Akashi; Yoshinori Toyoguchi, Yao, all of Japan

[73] Assignee: Matsushita Electric Industrial Co., Ltd., Kodoma, Japan

[21] Appl. No.: 180,416

[22] Filed: Jan. 12, 1994

[30] Foreign Application Priority Data

Jan. 14, 1993 [JP] Japan ................................. 5-004930
Feb. 16, 1993 [JP] Japan ................................. 5-051460

[51] Int. Cl.$^6$ ............................................. H01M 4/62
[52] U.S. Cl. ..................... 429/194; 429/218; 429/232
[58] Field of Search .............................. 429/194, 217, 429/232, 218; 252/182.1

[56] References Cited

U.S. PATENT DOCUMENTS

| | | | |
|---|---|---|---|
| 4,263,383 | 4/1981 | Coulombeau et al. | 429/232 X |
| 4,707,423 | 11/1987 | Kalnin et al. | 429/194 X |
| 4,980,250 | 12/1990 | Takahashi et al. | 429/194 |
| 5,225,296 | 7/1993 | Ohsawa et al. | 429/218 |
| 5,292,601 | 3/1994 | Sugeno et al. | 429/232 X |
| 5,346,783 | 9/1994 | Tomantschger et al. | 429/232 X |

FOREIGN PATENT DOCUMENTS 3115110  5/1991  Japan.

*Primary Examiner*—Anthony Skapars
*Attorney, Agent, or Firm*—Cushman, Darby & Cushman

[57] ABSTRACT

An electrode for a non-aqueous electrolyte secondary battery to be embodied in both the anode and cathode. It comprises a mixture including, an active material having reversibility for charging and discharging, and a whisker which is chemically and electrochemically inert. Said active material is a substance capable of reversibly intercalating and deintercalating lithium. Said mixture includes a binding agent and constitutes a solid structural body. Said whisker is at least one selected from the group consisting of silicon carbide whisker, silicon nitride whisker, potassium titanate whisker and aluminum borate whisker.

17 Claims, 4 Drawing Sheets

ELECTRODE FOR NON-AQUEOUS ELECTROLYTE SECONDARY BATTERY

BACKGROUND OF THE INVENTION

1. Field of the Invention

The present invention relates to an improvement in an electrode for a non-aqueous electrolyte secondary battery, which can be embodied in either or both of an anode and cathode of such a battery. More particularly, it is concerned with an improvement in the electrode which includes an electrode active material being capable of reversibly intercalating and deintercalating lithium.

2. Description of the Related Art

Secondary battery using a non-aqueous electrolyte and an anode of lithium has a high electromotive Force and is expected to have a higher energy density i.e., a larger capacity per unit weight and volume, as compared with the conventional nickel-cadmium battery and lead-acid battery. Thus, a number of researches and developments have been made on this subject.

Anodes made of metal lithium however have a disadvantage of being liable to develop a dendrite during a charging process, and the developed dendrite causes a short-circuit in the battery, and hence they give only a battery of poor reliability.

In order to overcome this disadvantage, an investigation has been made on an alloy anode comprising lithium and aluminum or lead for the battery. In a battery configured with this alloy anode, lithium is absorbed into the alloy of the anode during the charging process and thus is free from the dendrite formation, and therefore, the alloy anode gives a battery of high reliability. A discharge potential of the alloy anode is higher by about 0.5 V than that of the metal lithium, and hence the voltage of the battery decreases by 0.5 V. Accordingly, the energy density of the battery using the alloy anode is lowered.

On the other hand, research and development have actively been made on a subject of employing, as an anode active material, an inter-layer compound of a carbon material such as graphite and lithium. In an anode comprising the inter-layer compound, lithium enters into a space between the layers of carbon material during the charging process and hence no dendrite is formed. The discharge potential of this anode is higher only by 0.1 V than that of the metal lithium, and a decrease of the battery voltage is accordingly small. These fact ensured that the inter layer compound is more preferable active material for the anode.

The carbon material is generally obtained by heating an organic substance under an inert atmosphere at 400°–3000° C. to decompose the organic substance for its carbonization and graphitization.

In most cases, a starting material for the carbon material is an organic substance, and only the carbon atoms in the organic substance are retained after heating the organic substance up to a temperature at 1500° C., and a graphite structure is grown by heating the remained carbon atoms up to a higher temperature near 3000° C.

As the starting material or the organic substance used in the prior art are a liquid phase material of pitch, coal tar or a mixture of coke with pitch, and a solid phase material of wood material, a fran resin, cellulose, polyacrylonitrile and rayon. Further, a gas phase material is exemplified as gaseous hydrocarbons of methane, propane and the like.

Hitherto, there has been an attempt of employing a so-called graphitizing carbon material as the material for the anode in the non-aqueous electrolyte secondary battery. The graphitizing carbon material may be obtained in general by baking a starting material such as petroleum pitch at a high temperature of 2000° C. or higher and has a grown graphite structure. Another attempt hitherto made is directed to a so-called non-graphitizing carbon material, which is obtained by baking a starting material of a thermo-setting resin exemplified as fran resin at a relatively low temperature of 2000° C. or lower and has a turbostratic structure. Both the graphitizing carbon material and the non-graphitizing carbon material are proposed to be used as the material for the anode capable of intercalating and deintercalating lithium in the non-aqueous electrolyte secondary battery.

On the other hand, $MnO_2$ and $TiS_2$ have been enthusiastically investigated as the active material for the cathode. $MnO_2$ and $TiS_2$ have a potential with reference to Li of about 3 V. Recently, $LiMn_2O_4$, $LiNiO_2$ and $LiCoO_2$ have been attracting an attention of this art as the active material for the cathode which exhibits a charge/discharge potential of about 4 V with reference to lithium, and research and development on this active material have been very active. Some of them have already been put in practical use at present.

As mentioned above, there has been and is now continuing a number of efforts directed for increasing a battery voltage as a means for obtaining a high energy density in the battery together with another effort directed for enlarging discharge or service capacity of the battery.

There is also a disadvantage in the above-mentioned case of employing an inter-layer compound of a carbon material such as graphite and lithium as an anode active material. That is, a decrease in the discharge or service capacity occurs in a battery employing this anode active material with a long lasting repetition of charging and discharging cycles.

In order to cope with this disadvantage, a countermeasure is taken by incorporating a fibrous graphite or a glass fiber coated with a carbon material into the anode. These fibrous materials are manufactured by spinning a precursor of carbon fiber or a glass material in general and have a relatively large fibrous diameter of about 6 μm or more and hence are bulky in certain extent. Therefore, in case of incorporating these fibrous materials into the anode, an increased amount of binding agent is required for increasing a strength of an electrode plate, thereby causing another disadvantage of decrease in the initial capacity and the like. In an alternative case of limiting the amount of the binding agent for securing the target initial capacity, the electrode plate becomes to have an insufficient strength, which results in a battery of insufficient charging and discharging cycle characteristics.

A similar disadvantage is also encountered with the cathode. That is, in the cathode, one disadvantage to be overcome is to effectively prevent a decrease in the discharge or service capacity with a long lasting repetition of charging and discharging cycles. In order to overcome the disadvantage, a number of efforts have been made on an improvement in the cathode active material, on an investigation of the electrolyte, on an improvement in a separator, and the like.

There are many causes for the decrease in the discharge or service capacity of a battery in case of repetitive charging and discharging cycles. One of the causes is a phenomenon that the cathode active material is reduced to its minuteness by the repetition of charging and discharging cycles even in the above-mentioned compound capable of intercalating and deintercalating lithium. The phenomenon of reducing the active material to minuteness becomes remarkable with a continued repetition of charging and discharging cycles. As a result, the electrode is finally disintegrated in a case wherein the above-mentioned phenomenon has been most proceeded. Therefore, many investigation have also been made on the binding agent and the result of some investigation are proposed for coping with the above-mentioned phenomenon. At present, a fluorocarbon resin, a rubber resin, a polyolefine or the like is preferably employed as the binding agent.

Even with the employment of an investigated and proven binding agent, there is still a disadvantage that a sufficient cycle characteristics cannot be obtained with the battery incorporating the binding agent. It is believed that the cathode active material expands and contracts with the intercalation and deintercalation of lithium, and this causes a defect in the electrode ability of holding the active material and another defect of poor collecting of current.

In order to overcome this disadvantage, a countermeasure has been taken to incorporate a fibrous graphite or a glass fiber coated with a carbon material into the cathode as in the case of the anode. As previously described, these fibrous materials are generally bulky. Therefore, as in the case of the anode, an increased amount of binding agent is required for increasing the strength of an electrode plate, thereby causing another disadvantage of decrease in the initial capacity and the like.

In an alternative case of limiting the amount of the binding agent for maintaining the target initial capacity, the electrode plate becomes to have an insufficient strength, resulting in a battery of insufficient charging and discharging cycle characteristics.

SUMMARY OF THE INVENTION

It is therefore an object of the present invention to provide an electrode for a non-aqueous electrolyte secondary battery, which overcomes the above-mentioned and numerous other disadvantages and deficiency of the prior art, and is excellent in the charging and discharging cycle characteristics.

The disadvantages to be overcome by the present invention include the lowering of the service capacity with repetition of charging and discharging cycles and the deficiency in the cycle characteristics.

The present invention provides an electrode as an anode or a cathode of a non-aqueous electrolyte secondary battery comprising:

a mixture including an active material having reversibility for charging and discharging, and a whisker which is chemically and electrochemically inert.

The above-mentioned active material is preferably a substance capable of reversibly intercalating and deintercalating lithium. An anode active material is preferably a carbon material. A cathode active material capable of reversibly intercalating and deintercalating lithium is preferably one selected from the group consisting of $LiCoO_2$, $LiMn_2O_4$, $LiNiO_2$, $LiFeO_2$, $\gamma\text{-}LiV_2O_5$, $MnO_2$, $TiS_2$, $MoS_2$, $V_2O_5$ and $V_6O_{13}$.

The whisker for incorporating into the electrode of the present invention is preferably at least one selected from the group consisting of silicon carbide whisker, silicon nitride whisker, potassium titanate whisker and aluminum borate whisker.

It is further preferable to use the whisker with carbon-coated surface. It is advantageous to use a whisker whose surface is coated with nickel, copper or stainless steel for the anode, and to use a whisker whose surface is coated with titanium, aluminum or stainless steel for the cathode, respectively.

It is desirable to use the whisker in a content of 0.5–20% by weight of said electrode active material.

The size of the whisker is preferably of a mean diameter of from 0.1 μm to 3 μm, and a meanlength of from 3 μm to 50 μm.

The present invention relates to a method for producing an electrode for a non-aqueous electrolyte secondary battery comprising:

a step of mixing a starting material for the electrode active material with a whisker which is chemically and electrochemically inert material, and a step of heating said mixture thus obtained, thereby producing the active material which is intimately mixed with said whisker.

In the production of the anode, it is preferable to use an organic substance which is at least one selected from the group consisting of pitch, coal tar and coke, and to use a heating temperature in a range from 400° C. to 1400° C.

In the production of the cathode, it is preferable to preliminary mix a whisker which is chemically and electrochemically inert material with a starting material for the active material at the time of synthesizing the cathode active material, and then to heat the mixture obtained in the previous step at a temperature in a range between 400° C. and 1400° C.

The present invention further relates to a non-aqueous electrolyte secondary battery comprising:

a cathode and;an anode which have reversibility for charging and discharging, and a non-aqueous electrolyte including a lithium salt.

At least one of said cathode and anode is preferably one of the above-defined electrodes.

In accordance with the present invention, it is possible to obtain an electrode which exhibits a very small decrease of capacity during the charging and discharging cycles.

It is believed that the above-mentioned improvement in the charging and discharging cycle characteristics is owing to the whisker contained in the active material. The whisker performs a function of compensating the deficiency in the current collecting function caused by the repetition of the expansion and contraction of the active material during the charging and discharging cycles.

When a battery is constituted, particles of the active material are in an initial state of closely contacting one another for ensuring a preferable electrical contact. It is however assumed that distances between the particles would be widened by the repetition of the expansions of crystals at the time of the intercalation of Li (charging at the anode and discharging at the cathode) and the contractions of crystals at the time of the deintercalation of Li (discharging at the anode and charging at the cathode). As a result, insufficient electrical contacts among the particles would be brought to the battery.

It is assumed that the whisker incorporated into the active material suppresses the widening of the distances among the particles of the active material attributable to the repetition of the expansion and contraction of the active material. In other words, it is believed that the whisker performs the function of maintaining the preferable initial state of the structure inside the electrode.

In addition, it is effective for improving the rapid charging and discharging cycle characteristics of an electrode, in particular, to employ a whisker whose surface is coated with carbon or the above mentioned metal such as stainless steel. The reason is that the whiskers perform a current collecting function in addition to the above-mentioned structure maintaining function.

It is therefore possible to obtain a non-aqueous electrolyte secondary battery of a high energy density and a small decrease in the discharge or service capacity with the repeated charging and discharging cycles, by employing the electrode of the present invention.

While the novel features of the present invention are set fourth particularly in the appended claims, the invention, both as to organization and content, will be better understood and appreciated, along with other objects and features thereof, from the following detailed description taken in conjunction with the attached drawings.

Figure 1:
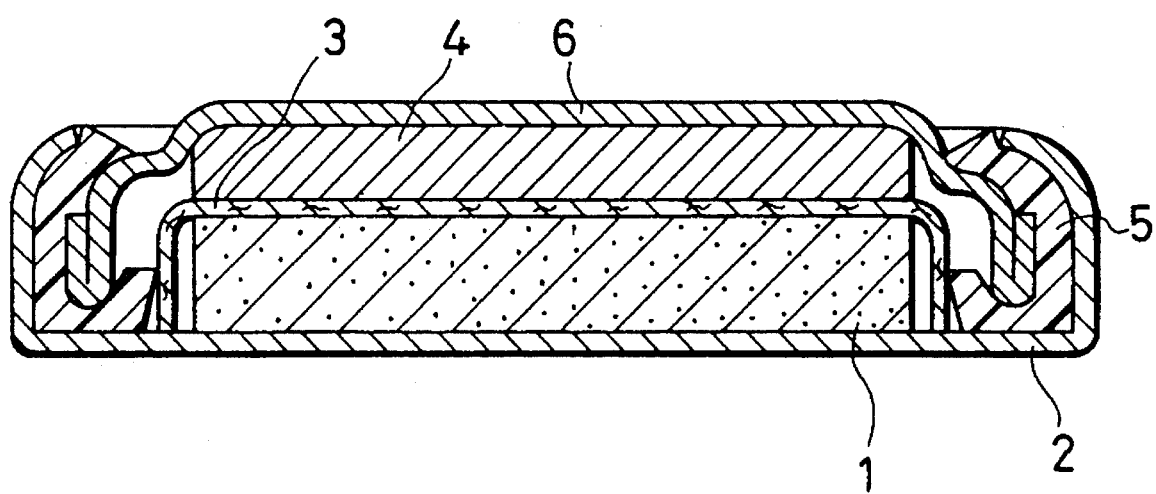
FIG. 1 is a cross-sectional side view showing a test cell used in an embodiment of the present invention.

It will be recognized that some or all of the Figures are schematic representations for purpose of illustration and do not necessarily depict the actual relative sizes or locations of the elements shown.

DETAILED DESCRIPTION OF THE INVENTION

The electrode for a non-aqueous electrolyte secondary battery in accordance with the present invention comprises a mixture of a powder of an electrode active material, which preferably and reversibly intercalates and deintercalates lithium, a whisker and a binding agent, and also an electrically conductive support. A conductive agent may be optionally added to the mixture when desired.

The above mentioned mixture is pelletized by means of press-molding, or alternatively placed on the electrically conductive support, and the whole is made integral pellets with the support by an application of pressure. In another embodiment, the mixture is made to be a paste by addition of an appropriate medium, and the paste is applied on the electrically conductive support. After drying, the applied support is then rolled and bonded together into a unitary structure with the support.

In the electrode configured as a solid structure in the above-mentioned manner, the whisker performs a structure-maintaining function as previously described.

As a result of a diversified investigation on fibrous reinforcing materials to be added to the electrode, the present inventors have now found that the above-mentioned whisker has an appropriate strength and a size as the reinforcing material for the electrode structure and that the whisker can effectively suppress the decrease in the capacity of the electrode caused by the repetition of the charging and discharging cycles.

It is also found that the rapid charging and discharging characteristics of the electrode can be improved if the surface of the incorporated whisker is coated with carbon or the above-mentioned metal such as stainless steel. It is explained that an electric conductivity of coated layer improves the stated rapid charging and discharging characteristics of the electrode.

As a method for coating the surface of the whisker with carbon or a metal such as stainless steel, a gas phase process such as CVD or a sputtering process which is known as a means for forming a thin film can be employed. A deposition process in a solution may also be used for this purpose.

In order to obtain a mixture, in which the electrode active material and the whisker are intimately mixed, it is preferable to employ a process of mixing the whisker with a raw material for the electrode active material and subsequently heat the mixture to synthesize the electrode active material, which makes close contact with the whisker.

As the starting material for the carbon material in the anode active material, preferable one is an organic substance such as petroleum pitch, coal tar, coke or a mixture thereof, which gives the carbon material at carbonization by heating.

The cathode active material employed in the present invention is roughly classified into the following three categories:

(1) A lithium-containing complex oxide such as $LiCoO_2$, $LiMn_2O_4$, $LiNiO_2$, $LiFeO_2$, or $\gamma\text{-}LiV_2O_5$ (2) A metal oxide such as $MnO_2$, $V_2O_5$ or $V_6O_{13}$ (3) A metal sulfide such as $TiS_2$ or $MoS_2$.

The starting material suitable for the complex oxide listed in the above (1) is a combination of a lithium compound with a compound of a metal, e.g. cobalt, which constitutes the intended complex oxide. The lithium compound includes lithium oxide, or a lithium salt which gives a lithium oxide upon heating. Such a lithium salt is lithium hydroxide, lithium carbonate, lithium sulfate, lithium nitrate, lithium chloride. The compound of the metal includes an oxide, or a salt which gives an oxide upon heating. As such a salt, there is exemplified a hydroxide, a carbonate, a sulfate, a nitrate, a chloride, or the like.

Preferable starting material for the metal oxides listed in the above (2) is a lower oxide for the intended metal oxide, a metal hydroxide, a metal carbonate, a metal sulfate, a metal nitrate or a metal chloride.

The metal sulfide listed as (3) in the above-mentioned list is obtainable by heating metal titanium or metal molybdenum and sulfur in a vacuum atmosphere.

EXAMPLE 1

In this example, graphite was used as the material for the anode.

As the whisker for mixing with the graphite, there were employed silicon carbide whisker, silicon nitride whisker, potassium titanate whisker and aluminum borate whisker, respectively. All of these whiskers had a size of a mean diameter of 1 μm and of a mean length of 10 μm.

An anode mixture was prepared by mixing 10 g of respective one of the above-mentioned whiskers and 5 g of polyethylene powder as the binding agent with 100 g of graphite powder. Then, 0.1 g of the respective anode mixtures thus obtained were formed into disks of 17.5 mm in diameter by application of pressure, to make the electrodes of the present invention.

FIG. 1 shows a configuration of a test cell for evaluating the electrodes thus obtained.

In FIG. 1, the above-mentioned electrode 1 is placed in the center of a case 2 made of stainless steel. A separator 3 of a micro-porous polypropylene film is placed on the electrode 1. As a non-aqueous electrolyte, a mixed solution of ethylene carbonate and 1,2-dimethoxyethane in 1:1 by volume which dissolves lithium perchlorate (LiClO$_4$) in 1 mole/lit. was used. After pouring this electrolyte over the above-mentioned separator, an open end of the case 2 was sealed by a disk lid 6 made of stainless steel, which is provided with a metal lithium disk 4 of 17.5 mm in diameter on the inside and a gasket 5 made of polypropylene on the periphery. Thus a hermetically sealed test cell was fabricated.

Separately, test cells of comparative examples were produced in a similar manner as that of the above-mentioned example. The test cells are: a cell configured with an electrode produced without mixing the whisker, a cell configured with an electrode produced by mixing a fibrous graphite in place of the whisker, and a cell configured with an electrode produced by mixing a glass fiber coated with carbon in place of the whisker. The above-mentioned fibrous graphite had a size of a mean diameter of 8 μm and of a mean length of 20 μm. The glass fiber coated with carbon had a size of a mean diameter of 6 μm and of a mean length of 18 μm.

Using these test cells, cathode polarization (which is equivalent to charging in a case of taking the electrode 1 as the anode) and anode polarization (which is equivalent to discharging) were repeated at a constant current of 0.8 mA for evaluating the electrode characteristics. The cathode polarization was continued up to a state wherein the potential of the electrode 1 became 0 V with reference to the counter electrode 4, and then the anode polarization was continued up to a state wherein the potential of the electrode 1 became 1.0 V with reference to the counter electrode 4.

Table 1 summarizes discharge capacities of the respective cells per one gram of the anode active material, i.e., the graphite in the first cycle, discharge capacities in the 100th cycle, and capacity maintenance rates in the 100th cycle.

TABLE 1

| No. | Added whisker | Discharge capacity in the 1st cycle (mAh/g) | Discharge capacity in the 100th cycle (mAh/g) | Capacity maintenance rate in the 100th cycle (%) |
|---|---|---|---|---|
| 1.1 | Silicon carbide | 335 | 302 | 90 |
| 1.2 | Silicon nitride | 340 | 299 | 88 |
| 1.3 | Potassium titanate | 340 | 323 | 95 |
| 1.4 | Aluminum borate | 335 | 285 | 85 |
| 1.5 | None(comparative example) | 350 | 140 | 40 |
| 1.6 | Fibrous graphite (comparative example) | 340 | 204 | 60 |
| 1.7 | Glass fiber coated with carbon (comparative example) | 330 | 160 | 48 |

As clearly shown by Table 1, the discharge capacities in the first cycle were almost the same for the respective test cells. In contrast to this, the test cells configured with the electrodes produced by adding the whisker thereto however exhibited very small decreases in the capacities attributable to the repetition of charging and discharging cycles as compared with the cells of the comparative examples. This fact is supported by the comparisons of the discharge capacities and the capacity maintenance rates in the 100th cycle listed in Table 1.

Although graphite is used as the material for the anodes in this example, it is needless to say that a similar advantage is obtained with a carbon material or another graphite material, so far as it has reversibility for the charging and discharging.

It is considered that the whisker incorporated into the active material performs a function of suppressing the widening of the spaces among the particles of the active material with the repetition of the expansion and contraction of the electrode caused by the charging and discharging. In other words, the whisker is considered to perform a function of maintaining the structure inside the electrode to its initial state.

Further, the diameter and length of the whisker are sufficiently small as compared with those of the carbon fiber or the glass fiber, and accordingly the whisker can easily be dispersed effectively and homogeneously in spaces among the particles of the active material. Therefore, there is no occurrence of a problem such as decrease in the electrode density.

EXAMPLE 2

In this example, a detailed investigation was made on the mixing ratio of the whisker to the active material.

As the material for the anode, graphite was used. As the whisker, potassium titanate whisker with a size of a mean diameter of 1 μm and of a mean length of 10 μm was used.

Nine electrodes are produced using anode mixtures, varying the mixing ratio from 0 g to 30 g of the whisker to 100 g of graphite and 5 g of the binding agent as listed in Table 2 below. By using these electrodes, test cells each having a configuration similar to those of Example 1 were produced, for evaluating the electrode characteristics under the same charging and discharging conditions as those in Example 1.

Table 2 summarizes discharge capacities of the respective cells per one gram of the anode active material in the first cycle, and discharge capacities and capacity maintenance rates in the 100th cycle.

TABLE 2

| No. | Mixing ratio (wt %) | Discharge capacity in the 1st cycle (mAh/g) | Discharge capacity in the 100th cycle (mAh/g) | Capacity maintenance rate in the 100th cycle (%) |
|---|---|---|---|---|
| 2.1 | 0 | 350 | 140 | 40 |
| 2.2 | 0.1 | 348 | 271 | 78 |
| 2.3 | 0.5 | 345 | 311 | 90 |
| 2.4 | 1.0 | 343 | 316 | 92 |
| 2.5 | 2.0 | 343 | 316 | 92 |
| 2.6 | 5.0 | 339 | 319 | 94 |
| 2.7 | 10 | 333 | 316 | 95 |
| 2.8 | 20 | 328 | 312 | 95 |
| 2.9 | 30 | 305 | 290 | 95 |

From the results shown in Table 2, it was confirmed that an effect of improving the capacity maintenance rate was expected by mixing the whisker to the graphite even at a rate as much as 0.5% by weight of the graphite, and that the capacity maintenance rate increased with the increase in the proportion of the mixing. The increase in the capacity maintenance rate however became moderate around the mixing ratio in excess of 10% by weight and reached a plateau at that of 20% by weight or more. On the other hand, the initial discharge capacity slightly decreased with the increase in the whisker mixing ratio. From the above result, it was concluded that an appropriate value in the mixing rate of the whisker to the graphite powder was in a range between 0.5% and 20% by weight.

A similar result was obtained with each case of using any of silicon carbide whisker, silicon nitride whisker and aluminum borate whisker.

EXAMPLE 3

In this example, a detailed investigation was made on the effect of the carbon coated whiskers for the electrode characteristics.

As the material for the anode, graphite was used, and, as the whisker to be mixed with the graphite, carbon coated whiskers with a size of a mean diameter of 1 μm and of a mean length of 10 μm were used. The whiskers employed in this example included silicon carbide whisker, silicon nitride whisker, potassium titanate whisker and aluminum borate whisker as listed in Table 3 below, which also contains comparative examples produced without mixing the whisker and with mixing of a whisker without coating.

The coating of carbon on these whiskers was performed by means of CVD process. That is, the whisker was first placed in a reaction furnace in a stream of argon with benzene, and heated up to about 1000° C., thereby forming a carbon layer on the surface of the whisker.

Test cells each having a configuration similar to those of Example 1 were produced and subjected to the repetition of cathode polarization and anode polarization at a constant current of 3 mA for evaluating the electrode characteristics. The value of the charging and discharging current of 3 mA in this example was larger than those in Example 1 and Example 2 of 0.8 mA, and was of a rapid charging and discharging conditions. Table 3 summarizes the characteristics of the respective test cells.

TABLE 3

| No. | Added whisker | Discharge capacity in the 1st cycle (mAh/g) | Discharge capacity in the 100th cycle (mAh/g) | Capacity maintenance rate in the 100th cycle (%) |
|---|---|---|---|---|
| 3.1 | Silicon carbide coated with carbon | 340 | 313 | 92 |
| 3.2 | Silicon nitride coated with carbon | 338 | 304 | 90 |
| 3.3 | Potassium titanate coated with carbon | 342 | 325 | 95 |
| 3.4 | Aluminum borate coated with carbon | 340 | 306 | 90 |
| 3.5 | None(comparative example) | 345 | 138 | 40 |
| 3.6 | Potassium titanate (comparative example) | 325 | 260 | 80 |

As clearly shown by Table 3, it was appreciated that the capacity decreases of the test cells No.3.1–No.3.4 caused by the charging and discharging were small as compared with those of the test cell No.3.5, and were excellent in their charging and discharging cycle characteristics.

Of the test cells of the comparative examples, the test cell No.3.6, which employed the electrode mixed with the whisker having no carbon surface coating, had a high capacity maintenance rate as compared with the test cell No.3.5. It was therefore appreciated that the mixing of the whisker with the active material was also effective even in the rapid charging and discharging cycle test of this example. The test cell No.3.6 was however still inferior to the test cells of Nos.3.1–3.4, and hence the test cell No.3.6 was found to be insufficient in point of view of putting it to a practical use in a secondary battery.

As discussed in the above, it is possible to improve the rapid charging and discharging cycle performance of a secondary battery by employing the whisker whose surface is coated with carbon. It is considered that the improvement is attributable to a current collecting function of the coated whisker in addition to its structure maintaining function.

Although the CVD process was employed as a means for carbon coating in this example, a similar advantage can be obtained by another means for forming thin film of carbon, for instance a gas phase process such as sputtering or a deposition process in a solution.

EXAMPLE 4

In this example, a detailed investigation was made on the effect of the whiskers whose surfaces were coated with nickel, copper, stainless steel and carbon respectively as listed in Table 4 below, for the electrode characteristics.

As the material for the anode, graphite was used, and, as the whisker to be mixed with the graphite, potassium titanate whisker with a size of a mean diameter of 1 μm and of a mean length of 10 μm was used.

The coating of nickel, copper or stainless steel on the whisker was performed by means of vapor deposition process. That is, the whisker was first placed in a reaction furnace in a vacuum, and was coated with the above-mentioned metal by irradiating the metal with an electron beam to be evaporated. The coating of carbon was performed in the same process as that in Example 3.

Test cells each having a configuration similar to those of Example 1 were produced, and subjected to the repetition of cathode polarization and anode polarization under the same conditions as those of Example 3. Table 4 summarizes discharge capacities of the respective cells per one gram of the anode active material in the first cycle, and discharge capacities and capacity maintenance rates in the 100th cycle.

TABLE 4

| No. | Coating material on the surface of the potassium titanate whisker | Discharge capacity in the 1st cycle (mAh/g) | Discharge capacity in the 100th cycle (mAh/g) | Capacity maintenance rate in the 100th cycle (%) |
|---|---|---|---|---|
| 4.1 | Nickel | 340 | 306 | 90 |
| 4.2 | Copper | 340 | 306 | 90 |
| 4.3 | Stainless steel | 340 | 313 | 92 |
| 4.4 | Carbon | 342 | 325 | 95 |
| 4.5 | None (comparative example) | 345 | 138 | 40 |

From the results shown in Table 4, it was appreciated that any of the test cells No.4.1–No.4.4 demonstrated higher values in the discharge capacity in the first cycle as well as the capacity maintenance rate in the 100th cycle, as compared with the test cell No.4.5 of the comparative example. It was further appreciated that although any of nickel, copper, stainless steel and carbon were preferable as the material for coating the surface of the whisker, carbon was found to be the most preferred coating material.

Although the above description was limited only to potassium titanate whisker, a result similar to those of the above-mentioned results was obtained with silicon carbide whisker, silicon nitride whisker or aluminum borate whisker.

Further, although a vapor deposition process was employed for coating metal such as nickel on the surface of the whisker in this example, it is needless to say that a similar advantage can be obtained by any other thin film forming process, for instance, a gas phase process such as sputtering or a deposition process in a liquid phase.

EXAMPLE 5

In this example, a detailed investigation was made on the mixing ratio of the whiskers to the active material.

As the material for the anode, graphite was used. The whisker to be mixed with the graphite was silicon carbide whisker of a mean diameter of 1 µm and of a mean length of 10 µm, its surface being coated with carbon.

Nine electrodes were produced with the whisker of from 0 g to 30 g as listed in Table 5 below added to 100 g of the graphite and 5 g of the binding agent. Using these electrodes, test cells were produced and subjected to the charging and discharging test under the same conditions as those in Example 3.

Table 5 summarizes discharge capacities of the respective cells per one gram of the anode active material in the first cycle, and discharge capacities and capacity maintenance rates in the 100th cycle.

TABLE 5

| Mixing ratio (wt %) | Discharge capacity in the 1st cycle (mAh/g) | Discharge capacity in the 100th cycle (mAh/g) | Capacity maintenance rate in the 100th cycle (%) |
|---|---|---|---|
| 0 | 345 | 138 | 40 |
| 0.1 | 345 | 241 | 70 |
| 0.5 | 344 | 310 | 90 |
| 1.0 | 344 | 309 | 90 |
| 2.0 | 342 | 315 | 92 |
| 5.0 | 342 | 321 | 94 |
| 10 | 341 | 321 | 94 |
| 20 | 340 | 323 | 95 |
| 30 | 320 | 304 | 95 |

As clearly shown in Table 5, an advantage of improving the capacity maintenance rate was obtained at a mixing rate of only about 0.1% by weight of the whisker to the graphite, and that the capacity maintenance rate increased with the increase of the mixing rate. The increase in the capacity maintenance rate however became moderate at the mixing ratio in excess of 10% by weight and reached its plateau at that of 20% by weight or larger. The initial discharge capacity however decreased with the increase in the mixing ratio. From these results, it was concluded that an appropriate mixing ratio of the whisker to the graphite powder was in a range between 0.5% by weight and 20% by weight.

In addition, it was also found that an advantage similar to those of the above-mentioned results was obtained with any case of using potassium titanate whisker, silicon nitride whisker and aluminum borate whisker in place of silicon carbide whisker which was used in this example.

EXAMPLE 6

In this example, a detailed investigation was made on the diameter and length of the whiskers.

As the material for the anode, graphite was used, and, as the whisker to be mixed with the graphite, potassium titanate whisker with the varying sizes of the diameter and the length as listed in Table 6 below, whose surface was coated with carbon was used.

Thirty electrodes were produced by mixing 10 g of respective one of the whiskers with 100 g of the graphite and 5 g of the binding agent. Using respective electrodes, test cells having the same configurations as those in Example 1 were produced and subjected to the charging and discharging test under the same conditions as those in Example 3.

Table 6 summarizes discharge capacities of the respective cells per one gram of the anode active material in the first cycle, and discharge capacities and capacity maintenance rates in the 100th cycle.

TABLE 6

| Whisker | | Discharge capacity in the 1st cycle (mAh/g) | Discharge capacity in the 100th cycle (mAh/g) | Capacity maintenance rate in the 100th cycle (%) |
|---|---|---|---|---|
| Diameter (µm) | Length (µm) | | | |
| 0.05 | 1 | 345 | 138 | 40 |
|  | 3 | 345 | 155 | 45 |
|  | 10 | 344 | 155 | 45 |
|  | 50 | 344 | 162 | 47 |
|  | 100 | 280 | 132 | 47 |
| 0.1 | 1 | 342 | 222 | 65 |
|  | 3 | 341 | 321 | 94 |
|  | 10 | 340 | 323 | 95 |
|  | 50 | 320 | 304 | 95 |
|  | 100 | 280 | 266 | 95 |
| 1.0 | 1 | 348 | 226 | 65 |
|  | 3 | 345 | 331 | 96 |
|  | 10 | 343 | 333 | 97 |
|  | 50 | 323 | 313 | 97 |
|  | 100 | 275 | 264 | 96 |
| 2.0 | 1 | 342 | 222 | 65 |
|  | 3 | 341 | 321 | 94 |
|  | 10 | 340 | 323 | 95 |
|  | 50 | 320 | 304 | 95 |
|  | 100 | 270 | 257 | 95 |
| 3.0 | 1 | 320 | 224 | 70 |
|  | 3 | 340 | 323 | 95 |
|  | 10 | 320 | 304 | 95 |
|  | 50 | 320 | 304 | 95 |
|  | 100 | 280 | 266 | 95 |
| 5.0 | 1 | 250 | 125 | 50 |
|  | 3 | 250 | 138 | 55 |
|  | 10 | 230 | 127 | 55 |
|  | 50 | 230 | 127 | 55 |
|  | 100 | 210 | 116 | 55 |

From the results shown in Table 6, it was appreciated that a large initial capacity and a high capacity maintenance rate in the 100th cycle were obtained in respective cases of using the whiskers having a mean diameter ranging from 0.1 µm to 3 µm and a mean length ranging from 3 µm to 50 µm.

It was further confirmed that a whisker having a mean diameter ranging from 0.1 µm to 3 µm and a mean length ranging from 3 µm to 50 µm was also appropriate in cases of using silicon carbide whisker, silicon nitride whisker and aluminum borate whisker in place of the potassium titanate whisker which was used in this example.

EXAMPLE 7

In this example, a description was made on an anode active material incorporated with a whisker when the active material was in its state of a precursor for the carbon material. The active material was obtained first by mixing some whisker with an organic substance which was the precursor of the carbon material constituting the active material, and then by heating the mixture thus obtained, thereby carbonizing said organic substance to obtain the active material containing the whisker.

As the organic substance as the precursor or the starting material for the active material, petroleum pitch was used, and as the whisker, potassium titanate whisker having a size of a mean diameter of 1 μm and a mean length of 10 μm was used.

First, the potassium titanate whisker was added to said organic substance in an amount equivalent to 2% by weight to the latter, and the whole was thoroughly mixed. The mixture thus obtained was then heated at a temperature ranging from 300° C. to 1600° C. as listed in Table 7 below.

Eight electrodes were produced by mixing respective 5 g of the binding agent with respective 100 g of the thus obtained carbon materials containing whisker, and by molding the respective mixtures with an application of pressure. Using these electrodes, respective test cells having a configuration similar to those in Example 1 were produced, and they were subjected to the charging and discharging tests under the conditions similar to those in Example 3.

Table 7 summarizes discharge capacities of the respective cells per one gram of the anode active material in the first cycle, and discharge capacities and capacity maintenance rates in the 100th cycle.

TABLE 7

| No. | Heating temperature (°C.) | Discharge capacity in the 1st cycle (mAh/g) | Discharge capacity in the 100th cycle (mAh/g) | Capacity maintenance rate in the 100th cycle (%) |
| --- | --- | --- | --- | --- |
| 7.1 | 300 | 250 | 225 | 90 |
| 7.2 | 400 | 330 | 317 | 96 |
| 7.3 | 600 | 340 | 333 | 98 |
| 7.4 | 800 | 350 | 343 | 98 |
| 7.5 | 1000 | 350 | 350 | 100 |
| 7.6 | 1200 | 350 | 350 | 100 |
| 7.7 | 1400 | 340 | 326 | 96 |
| 7.8 | 1600 | 340 | 163 | 48 |
| 7.9 | No whisker (comparative example) | 350 | 105 | 30 |
| 7.10 | Simple addition of whisker (comparative example) | 350 | 315 | 90 |

From the results shown in Table 7, it was appreciated that it was desirable to employ a temperature ranging from 400° C. to 1400° C. which brought a large initial capacity and a high capacity maintenance rate after 100 cycles.

In contrast to this, the comparative example No.7.9 of no whisker addition had a large initial capacity but however had a remarkably small capacity maintenance rate. The electrode active material in the other comparative example No.7.10 was produced by simple addition of the whisker to the already finished carbon material and exhibited the high values in both the initial capacity and the cycle capacity maintenance rate. It was however appreciated that the test cells Nos.7.2–7.7 were more excellent in the cycle capacity maintenance rate than the test cell No.7.10.

A heating temperature lower than 400° C. resulted in a small capacity. It is believed that the small capacity was attributable to an insufficient carbonization. On the other hand, when the heating temperature is higher than 1400° C., a thermal decomposition of the whisker was remarkably proceeded during the heating process and the thus decomposed whisker was made to unable to perform its structure maintaining function, thereby worsening the capacity maintenance rate.

Another investigation similar to those in the above-mentioned was made on the organic substance such as coal tar or coke which is the precursors for the carbon material in place of the petroleum pitch used in this example. A similar investigation was also made on silicon carbide whisker, silicon nitride whisker or aluminum borate whisker used in place of potassium titanate whisker of this example. As a result, it was confirmed that the preferable heating temperature in either of these cases was in a range between 400° C. and 1400° C.

It was further confirmed that a similarly preferable capacity maintenance rate was obtained with the whisker whose surface was coated with nickel, copper, stainless steel or carbon.

EXAMPLE 8

Figure 2:
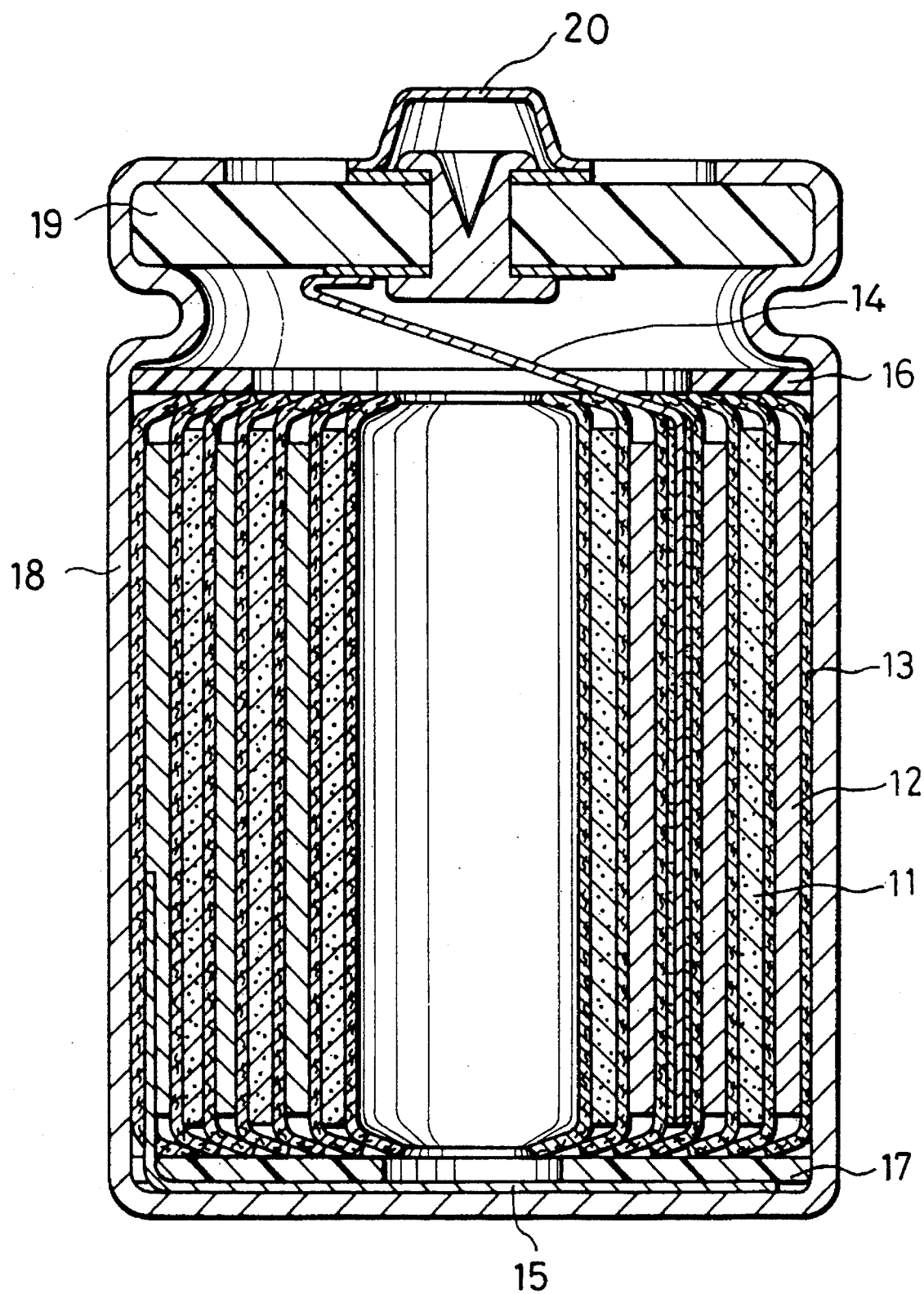
FIG. 2 is a cross-sectional side view showing a non-aqueous electrolyte secondary battery configured in accordance with an embodiment of the present invention.

In this example, a cylindrical type storage battery having a configuration as shown in FIG. 2 was produced and its characteristics were evaluated.

The battery was produced in the following procedure.

[Cathode]

First, $LiMn_{1.8}Co_{0.2}O_4$ to be used as a cathode active material was synthesized by mixing $Li_2CO_3$, $Mn_3O_4$ and $CoCO_3$ in a predetermined molar ratio, and heating the mixture at 900° C. This was then pulverized and sieved to obtain particles of 100 mesh or finer. Thereafter, to 100 g of the particles, added 10 g of carbon power as a conductive agent, an aqueous dispersion containing 8 g of polytetrafluoroethylene and deionized water; and the added whole was thoroughly mixed to obtain a paste. This paste was applied on a core material of titanium sheet, dried and rolled with an application of pressure to give the cathode 11. A cathode lead wire 14 made of the same material as that of the core material was then spot-welded on the cathode 11.

[Anode]

On the other hand, to 100 g of graphite powder to be used as the anode active material, 5 g of potassium titanate whisker having a mean diameter of 1 μm and mean length of 10 μm and being coated with carbon, and 7 g of polyfluorovinylidene powder are added. Then, the added whole was thoroughly mixed with dimethyl formamide to give a paste. The paste thus obtained was then applied on a core material of nickel sheet, dried and rolled with an application of pressure to give the anode 12. The anode lead wire 15 made of the same material as that of the core material was spot-welded on the anode 12.

[Electrode assembly]

Then, the thus prepared cathode 11 was rolled up together with the anode 12 and a separator 13 of porous polypropylene film strip having a width greater than those of the both electrodes, being disposed between the two electrodes, resulting in a cylindrical roll of electrode assembly.

[Battery A]

Two disks of insulator plates 16 and 17 were placed on top and bottom of the cylindrical roll of electrode assembly, and the whole was inserted into a metal case 18. After forming a reduced diameter step near the upper open end of the case 18, an electrolyte, which was composed of a mixed solution of ethylene carbonate and 1,2-dimethoxyethane in 1:1 by volume and containing lithium perchlorate in 1 mole/lit. was poured into the case 18. Then, the open end of the case 18 was sealed with a polypropylene lid 19 having a cathode terminal 20.

[Battery B]

On the other hand, an anode without the whisker was produced with a paste prepared by adding 10 g of polyfluorovinylidene to 100 g of graphite powder and dimethyl formamide which was then applied on a core material of nickel, dried and rolled. Using the thus produced anode and the above-mentioned cathode, Battery B was produced in the same manner as above-mentioned.

[Battery C]

Further, another anode was produced with a paste prepared by adding 5 g of fibrous graphite and 10 g of polyfluorovinylidene to 100 g of graphite powder and dimethyl formamide which was then applied on a core material of nickel, dried and rolled. Using the thus produced anode and the above-mentioned cathode, Battery C was produced in the same manner as above-mentioned.

Figure 3:
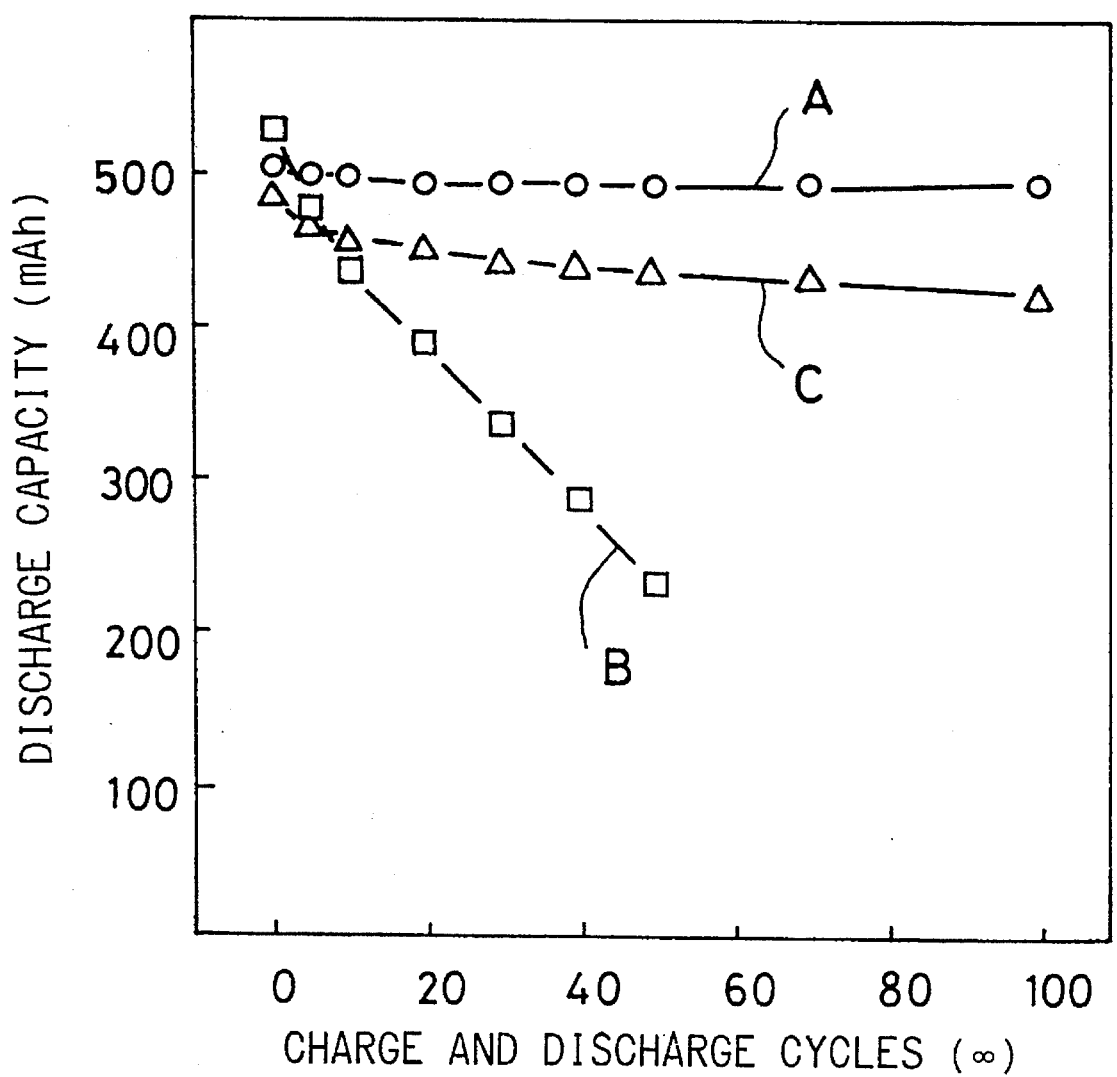
FIG. 3 is a graph showing the charge/discharge cycle characteristics of the batteries configured in accordance with the embodiment of the present invention and that of a comparative example.

Charging and discharging experiments were performed on these batteries under the conditions of a constant charging and discharging current of 0.5 mA/cm$^2$ and a range of charging and discharging voltage between 4.3 V and 3.0 V. The results of the experiments are shown in FIG. 3.

[Evaluation]

Battery B exhibited a severe decrease of capacity by the repetition of charging and discharging cycles, and the capacity after about 50 cycles became smaller than half of the initial value. When disassembling this battery with the thus decreased capacity, it was observed that the deposition of lithium was developed over the entire surface of the anode. Although Battery C exhibited a moderate decrease in its capacity by the repetition of the charging and discharging cycles as compared with that of Battery B, the initial capacity was small as compared with the other two batteries. When disassembling Battery C after being subjected to the charging and discharging of 100 cycles, it was also observed that the deposition of lithium was developed on the surface of the anode but the area of the deposition was rather limited as compared with that of Battery B.

In contrast to these, although Battery A of the present invention had a slightly small initial capacity as compared with Battery B, it exhibited a very favorable charging and discharging cycle characteristics. The capacity of Battery A after being subjected to the charging and discharging of 100 cycles was maintained to 95% of the initial capacity. When disassembling Battery A after 100 cycles, no lithium deposition was observed on the surface of the anode which had been observed with Batteries B and C. From these results, it was appreciated that the battery incorporated with the anode produced in accordance with the present invention had a very excellent charging and discharging cycle characteristics.

As previously described, the present invention provides a secondary battery having a high discharge voltage, a high discharge capacity and an excellent charging and discharging cycle characteristics.

In this example, although $LiMn_{1.8}Co_{0.2}O_4$ was used as the cathode active material, it is needless to say that a similar advantage can be obtained with the anode of the present invention when it is combined with a cathode having reversibility for the charging and discharging of, for instance, $LiCoO_2$, $LiNiO_2$, $LiFeO_2$ or $\gamma$-$LiV_2O_5$.

In addition to this, although only the cylindrical type battery was described in this example, it is also needless to say that the present invention is not be limited to this configuration. The reason is that the technical thought directed to the capacity increase and the like advantages obtained in compliance with the present invention is universal.

EXAMPLE 9

In this example, an investigation was made on the cathode employing $LiCoO_2$ as its active material.

As the whiskers for mixing with this active material, silicon carbide whisker, silicon nitride whisker, potassium titanate whisker and aluminum borate whisker were employed, respectively as listed in Table 8 below. Each of these whiskers had a mean diameter of 1 μm and a mean length of 10 μm.

A hundred (100) g of $LiCoO_2$ as the cathode active material was mixed with 2.0 g of graphite as the conductive agent, and to this mixture, added 2.0 g of respective ones of the above-defined whiskers and 3.0 g of polytetra-fluoroethylene resin powder as the binding agent, to obtain respective cathode mixtures. Respective 0.1 g of the cathode mixtures thus obtained were formed into disks each having a diameter of 17.5 mm with an application of pressure of 1 ton/cm$^2$ to obtain a cathode.

Test cells having a configuration similar to that shown in FIG. 1 were produced in a similar manner as that in the foregoing examples. In this example however, as the electrode 1, one of the cathodes obtained as above described was used, and as the electrode 4, an anode of a lithium sheet having a diameter of 17.5 mm and a thickness of 0.3 mm was used. As an electrolyte, an equivalent volume mixed solvent of propylene carbonate and 1,2-dimethoxyethane which dissolved lithium perchlorate in 1 mole/lit. was used.

In addition to this, test cells of comparative examples were also produced. These test cells include, a test cell using a cathode with no whisker, a test cell using a cathode added with fibrous graphite and a test cell using a cathode added with carbon coated glass fiber.

Using thus obtained coin type cells, charging and discharging cycle tests were performed with a constant charging and discharging current of 0.5 mA and a voltage ranging from 4.2 V to 3.0 V.

Table 8 shows the result of tests, i.e., the initial discharge capacity, and the discharge capacity and the capacity maintenance rate in the 100th cycle. Number of samples used in the tests are 50. In Table 8, the discharge capacities are shown as the values for 1 g of the cathode active material.

TABLE 8

| No. | Whisker added | Discharge capacity in the 1st cycle (mAh/g) | Discharge capacity in the 100th cycle (mAh/g) | Capacity maintenance rate in the 100th cycle (%) |
|---|---|---|---|---|
| 9.1 | Silicon carbide | 135 | 122 | 90 |
| 9.2 | Silicon nitride | 140 | 123 | 88 |
| 9.3 | Potassium titanate | 140 | 133 | 95 |
| 9.4 | Aluminum borate | 135 | 115 | 85 |
| 9.5 | None (C.example 1) | 150 | 60 | 40 |
| 9.6 | Fibrous graphite (C.example 2) | 130 | 78 | 60 |
| 9.7 | Carbon coated glass fiber (C.example 3) | 130 | 62 | 48 |

As clearly shown in Table 8, the discharge capacity in the first cycle exhibited by the comparative example 1 (Cell No. 9.5) was the largest and those by the comparative examples 2 and 3 (Cell Nos.9.6 and 9.7) were the smallest. On the other hand, Cells of Nos. 9.1–9.4 of this example all exhibited a very high value in the capacity maintenance rate as compared with those of the cells of the comparative examples.

As shown in the above, it was found that each of the electrodes added with the whisker exhibited a slight decrease in its initial capacity but had a very small decrease in its capacity caused by the repetition of the charging and discharging cycles.

In this example, although $LiCoO_2$ was used as the cathode active material, it is needless to say that a similar advantage to the above-mentioned can be obtained with any material having reversibility for the charging and discharging.

As described above, it is also believed that the whisker incorporated into the active material performs a function of suppressing the widening of the spaces among the particles of the active material with the repetitions of the expansion and contraction of the electrode caused by the charging and discharging. In other words, the whisker is considered to perform a function of maintaining the structure inside the electrode to its initial state.

EXAMPLE 10

In this example, a detailed investigation was made on mixing ratio of the whisker to the cathode active material.

As the cathode active material, $TiS_2$ was used and as the whisker, potassium titanate whisker with a size of a mean diameter of 1 μm and of a mean length of 10 μm was used.

Nine electrodes using cathode mixtures were produced, and respective electrodes comprise the whisker with various mixing ratio of as listed in Table 9 below from 0 g to 30 g of the whisker to 100 g of $TiS_2$, 2.0 g of graphite as the conductive agent and 3.0 g of the binding agent. Using these electrodes, test cells were produced in a manner similar to that of Example 9.

Conditions for the charging and discharging cycle tests were a constant charging and discharging current of 0.5 mA and a charging and discharging voltage ranging from 2.5 V to 1.5 V.

Table 9 summarizes discharge capacities of the respective cells per one gram of the cathode active material in the first cycle, and discharge capacities and capacity maintenance rates in the 100th cycle.

TABLE 9

| No. | Mixing ratio (wt %) | Discharge capacity in the 1st cycle (mAh/g) | Discharge capacity in the 100th cycle (mAh/g) | Capacity maintenance rate in the 100th cycle (%) |
|---|---|---|---|---|
| 10.1 | 0 | 150 | 60 | 40 |
| 10.2 | 0.1 | 148 | 115 | 78 |
| 10.3 | 0.5 | 145 | 131 | 90 |
| 10.4 | 1.0 | 143 | 132 | 92 |
| 10.5 | 2.0 | 143 | 132 | 92 |
| 10.6 | 5.0 | 139 | 131 | 94 |
| 10.7 | 10 | 133 | 126 | 95 |
| 10.8 | 20 | 128 | 122 | 95 |
| 10.9 | 30 | 105 | 100 | 95 |

As clearly shown in Table 9, it was confirmed that an effect of improving the capacity maintenance rate was expected by mixing the whisker to the cathode active material in as much as 0.5% by weight, and that the capacity maintenance rate increased with the increase in the mixing ratio of the whisker. The increase in the capacity maintenance rate however became moderate around the mixing ratio in excess of 10% by weight and reached a plateau at that of 20% by weight or more. From the above result, it was concluded that an appropriate value of the whisker mixing ratio to the cathode active material was in a range between 0.5% and 20% by weight.

It was further confirmed that a value of the whisker mixing ratio to the cathode active material ranging from 0.5% to 20% by weight was also appropriate in either case of using any of silicon carbide whisker, silicon nitride whisker and aluminum borate whisker.

EXAMPLE 11

In this example, a detailed investigation was made on the effect of the carbon coated whiskers for the battery characteristics.

As the cathode active material, $LiMn_2O_4$ was used, and, as the whisker to be mixed with the cathode active material, whiskers with a size of a mean diameter of 1 μm and of a mean length of 10 μm with carbon-coated surface were used. The whisker employed in this example included silicon carbide whisker, silicon nitride whisker, potassium titanate whisker and aluminum borate whisker as listed in Table 10 below, which also contains a comparative example without mixing of the whisker and another comparative example with mixing of potassium titanate whisker having no surface coating.

In order to evaluate the characteristics of the respective cathodes, test cells were produced in a manner similar to that in Example 9, and subjected to the repetition of charging and discharging cycles at a constant current of 3 mA and in a voltage ranging from 4.3 V to 3.0 V. The value of the charging and discharging current of 3 mA in this example was larger than those in Example 9 and Example 10 of 0.5 mA, and was equivalent to rapid charging and discharging conditions.

Table 10 summarizes the results of the charging and discharging tests.

TABLE 10

| No. | Added whisker | Discharge capacity in the 1st cycle (mAh/g) | Discharge capacity in the 100th cycle (mAh/g) | Capacity maintenance rate in the 100th cycle (%) |
|---|---|---|---|---|
| 11.1 | Silicon carbide coated with carbon | 140 | 129 | 92 |
| 11.2 | Silicon nitride coated with carbon | 138 | 124 | 90 |
| 11.3 | Potassium titanate coated with carbon | 142 | 135 | 95 |
| 11.4 | Aluminum borate coated with carbon | 140 | 126 | 90 |
| 11.5 | None (comparative example) | 115 | 46 | 40 |
| 11.6 | Potassium titanate (comparative example) | 125 | 100 | 80 |

As clearly shown in Table 10, it was appreciated that the decreases in the capacities of the test cells No.11.1–No.11.4 caused by the charging and discharging were small as compared with those of the test cells of the comparative examples, and that they were excellent in their charging and discharging cycle characteristics.

Of the test cells of the comparative examples, the test cell No.11.6, which employed the electrode mixed with the whisker having no carbon surface coating, had a high capacity maintenance rate as compared with the test cell No.11.5. It was therefore appreciated that the mixing of the whisker with the cathode active material was also effective even in the rapid charging and discharging cycle test of this example. The test cell No.11.6 was however still inferior to the test cells of Nos.11.1–11.4, and hence the test cell No.11.6 was insufficient in point of view of putting it to a practical use in a secondary battery.

As discussed in the above, it is possible to improve the rapid charging and discharging cycle performance of a secondary battery by employing the cathode which included the whisker with carbon-coated surface. It is believed that the improvement is attributable to a current collecting function of the coated whisker in addition to its structure maintaining function.

EXAMPLE 12

In this example, a detailed investigation was made on the effect of the whiskers with surfaces coated with titanium, aluminum, stainless steel and carbon respectively as listed in Table 11 below, for the battery characteristics.

As the material for the cathode active material, $LiCoO_2$ was used, and, as the whisker to be mixed with the active material, potassium titanate whisker with a size of a mean diameter of 1 μm and of a mean length of 10 μm was used.

The coating of nickel, copper or stainless steel on these whiskers was performed by means of vapor deposition process which is similar to that in Example 4. The coating of carbon was performed in the same process as that in Example 3.

Test cells were produced in a similar manner to that of Example 9 and subjected to the repetitions of charging and discharging cycles under the same conditions as those of Example 11. Table 11 summarizes discharge capacities of the respective cells per one gram of the cathode active material in the first cycle, and discharge capacities and capacity maintenance rates in the 100th cycle.

TABLE 11

| No. | Coating material on the surface of the potassium titanate | Discharge capacity in the 1st cycle (mAh/g) | Discharge capacity in the 100th cycle (mAh/g) | Capacity maintenance rate in the 100th cycle (%) |
|---|---|---|---|---|
| 12.1 | Titanium | 140 | 126 | 90 |
| 12.2 | Aluminum | 140 | 126 | 90 |
| 12.3 | Stainless steel | 140 | 129 | 92 |
| 12.4 | Carbon | 142 | 135 | 95 |
| 12.5 | None (comparative example) | 115 | 46 | 40 |

As clearly shown in Table 11, it is understood that any of the test cells No.12.1–No.12.4 demonstrated higher values in the discharge capacity in the first cycle as well as in the capacity maintenance rate in the 100th cycle, as compared with the test cell No.12.5 of the comparative example. From the above-mentioned result, it is understood that, although any of titanium, aluminum, stainless steel and carbon was good as the material for coating the surface of the whisker, carbon was found to be the best for coating material.

Although the above-mentioned description was limited only to potassium titanate whisker, a result similar to those of the above-mentioned results was obtained with any of silicon carbide whisker, silicon nitride whisker or aluminum borate whisker.

EXAMPLE 13

In this example, a detailed investigation was made on the mixing ratio of the whiskers to the cathode active material.

As the cathode active material, $LiNiO_2$ was used, and, as the whisker to be mixed with the cathode active material, silicon carbide whisker with a size of a mean diameter of 1 μm and of a mean length of 10 am whose surface was coated with carbon was used.

Nine electrodes were produced with each 100 g of the cathode active material $LiNiO_2$ added with the whisker of from 0 g to 30 g as listed in Table 12 below, 2.0 g of graphite and 3.0 g of the binding agent. Using these electrodes, test cells were produced and subjected to the charging and discharging test under the same conditions as those in Example 11.

Table 12 summarizes discharge capacities of the respective cells per one gram of the cathode active material in the first cycle, and discharge capacities and capacity maintenance rates in the 100th cycle.

TABLE 12

| Mixing ratio (wt %) | Discharge capacity in the 1st cycle (mAh/g) | Discharge capacity in the 100th cycle (mAh/g) | Capacity maintenance rate in the 100th cycle (%) |
|---|---|---|---|
| 0 | 115 | 46 | 40 |
| 0.1 | 145 | 102 | 70 |
| 0.5 | 144 | 130 | 90 |
| 1.0 | 144 | 130 | 90 |

TABLE 12-continued

| Mixing ratio (wt %) | Discharge capacity in the 1st cycle (mAh/g) | Discharge capacity in the 100th cycle (mAh/g) | Capacity maintenance rate in the 100th cycle (%) |
| --- | --- | --- | --- |
| 2.0 | 142 | 131 | 92 |
| 5.0 | 142 | 133 | 94 |
| 10 | 141 | 133 | 94 |
| 20 | 140 | 133 | 95 |
| 30 | 120 | 114 | 95 |

As clearly shown in Table 12, it was appreciated that an advantage of improving the capacity maintenance rate was able to be obtained by mixing ratio of only about 0.1% by weight of the whisker to the cathode active material, and that the capacity maintenance rate increased with the increase in the mixing ratio. The increase in the capacity maintenance rate however became moderate at the mixing ratio in excess of 10% by weight and reached its plateau at that of 20% by weight or larger. The initial discharge capacity however decreased with the increase in the mixing ratio of the whisker. From these results, it was concluded that an appropriate mixing ratio of the whisker to the cathode active material was in a range between 0.5% by weight and 20% by weight.

In addition, it was also found that an advantage similar to those of the above-mentioned was obtained with any case of using potassium titanate whisker, silicon nitride whisker and aluminum borate whisker in place of silicon carbide whisker which was used in this example.

EXAMPLE 14

In this example, a detailed investigation was made on the diameter and length of the whiskers.

As the cathode active material, $LiCoO_2$ was used, and, as the whisker to be mixed with the active material, potassium titanate whiskers with the carbon-coated surfaces were used. The cathode mixture was prepared by mixing 100 g of the cathode active material, 2.0 g of graphite, 2.0 g of the carbon coated potassium titanate whisker and 3.0 g of the binding agent. Each of the potassium titanate whiskers had the varying size of the diameter and the length as listed in Table 13 below with the carbon-coated surface.

Thirty test cells having the same configurations as those in Example 9 were produced and subjected to the charging and discharging test under the same conditions as those in Example 9.

Table 13 summarizes discharge capacities of the respective cells per one gram of the cathode active material in the first cycle, and discharge capacities and capacity maintenance rates in the 100th cycle.

TABLE 13

| Whisker | | Discharge capacity in the 1st cycle (mAh/g) | Discharge capacity in the 100th cycle (mAh/g) | Capacity maintenance rate in the 100th cycle (%) |
| --- | --- | --- | --- | --- |
| Diameter (μm) | Length (μm) | | | |
| 0.05 | 1 | 145 | 58 | 40 |
|  | 3 | 145 | 65 | 45 |
|  | 10 | 144 | 65 | 45 |
|  | 50 | 144 | 68 | 47 |
|  | 100 | 80 | 38 | 47 |
| 0.1 | 1 | 142 | 92 | 65 |
|  | 3 | 141 | 133 | 94 |
|  | 10 | 140 | 133 | 95 |
|  | 50 | 120 | 48 | 95 |
|  | 100 | 80 | 76 | 95 |
| 1.0 | 1 | 140 | 91 | 65 |
|  | 3 | 142 | 138 | 97 |
|  | 10 | 140 | 137 | 98 |
|  | 50 | 123 | 121 | 98 |
|  | 100 | 82 | 76 | 97 |
| 2.0 | 1 | 142 | 92 | 65 |
|  | 3 | 141 | 133 | 94 |
|  | 10 | 140 | 133 | 95 |
|  | 50 | 120 | 114 | 95 |
|  | 100 | 70 | 67 | 95 |
| 3.0 | 1 | 120 | 84 | 70 |
|  | 3 | 140 | 133 | 95 |
|  | 10 | 120 | 114 | 95 |
|  | 50 | 120 | 114 | 95 |
|  | 100 | 80 | 76 | 95 |
| 5.0 | 1 | 150 | 75 | 50 |
|  | 3 | 150 | 83 | 55 |
|  | 10 | 130 | 72 | 55 |
|  | 50 | 130 | 72 | 55 |
|  | 100 | 110 | 61 | 55 |

As clearly shown in Table 13, it was appreciated that a large initial capacity and a high capacity maintenance rate after 100 cycles were able to be obtained with the cases of using the whisker having a mean diameter ranging from 0.1 μm to 3 μm and a mean length ranging from 3 μm to 50 μm.

Further, it was confirmed that a whisker having a mean diameter ranging from 0.1 μm to 3 μm and a mean length ranging from 3 μm to 50 μm was also appropriate in either cases of using any of silicon carbide whisker, silicon nitride whisker and aluminum borate whisker in place of the potassium titanate whisker, which was used in this example.

EXAMPLE 15

In this example, a cylindrical type storage battery having a configuration as shown in FIG. 2 was produced and its characteristics were evaluated.

The battery was produced in the following procedure.

[Cathode]

First, a paste was prepared by mixing 100 g of $Li_2CO_3$ as the cathode active material, 2.0 of acetylene black as the conductive agent, 2.0 g of the carbon coated silicon carbide whisker having a mean diameter of 1 μm and a mean length of 10 μm, 4.0 g (resin component) of polytetrafluoroethylene resin in an aqueous dispersion as the binding agent and deionized water. This paste was then applied on a core material of titanium sheet, dried and rolled with an application of pressure to give the cathode.

[Anode]

The anode was obtained by bonding metal lithium on a core material of nickel with an application of a pressure.

[Battery "a"]

A cylindrical type battery was produced in a manner similar to that in Example 8 except for the employment of the above-mentioned cathode and anode.

[Batteries "b" and "c"]

As comparative examples, a Battery "b" using a cathode with no addition of the whisker and a Battery "c" using a cathode with the addition of fibrous graphite in place of the whisker were also produced.

Figure 4:
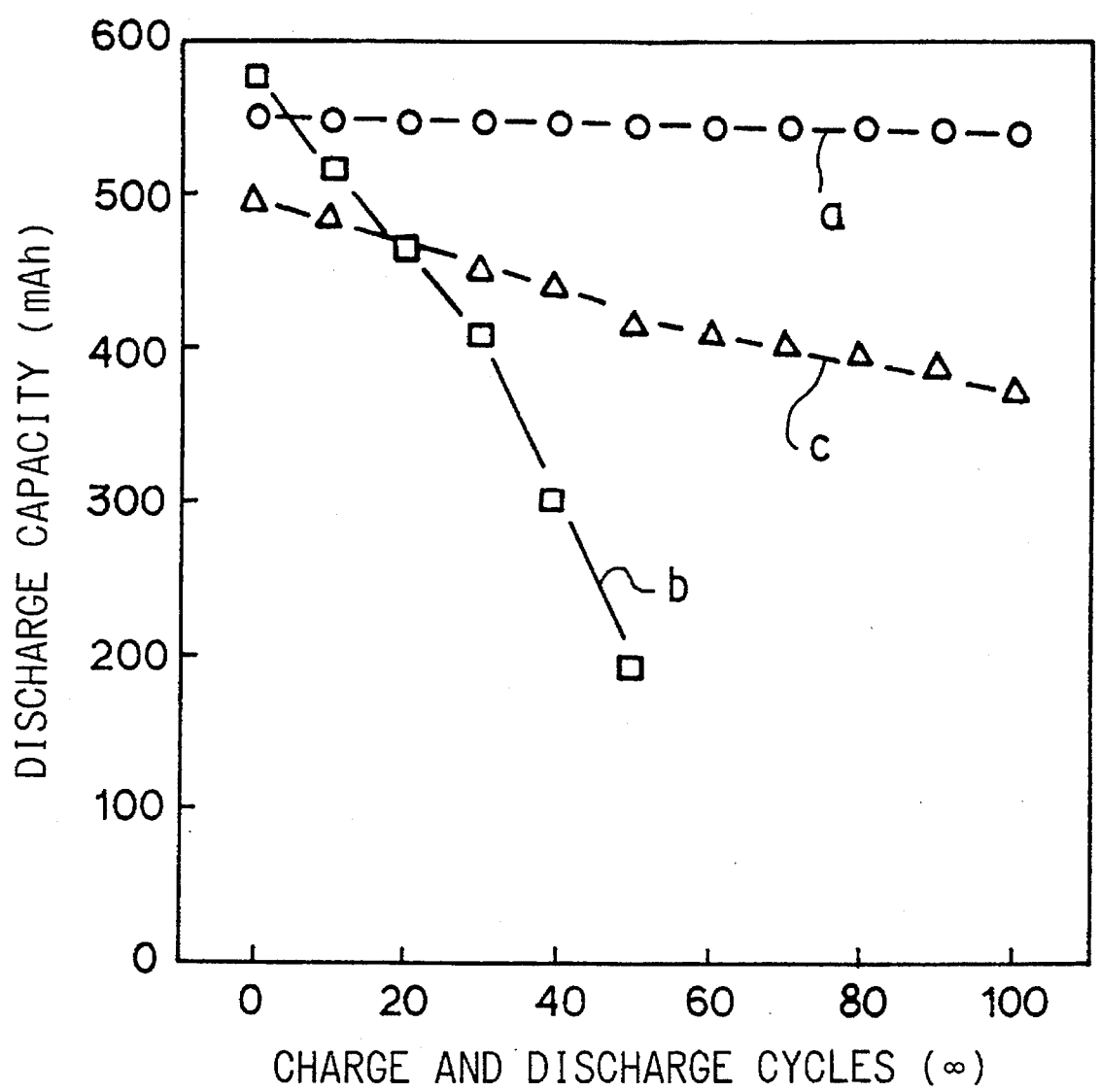
FIG. 4 is a graph showing the charge/discharge cycle characteristics of the batteries configured in accordance with the embodiment of the present invention and that of a comparative example.

Charging and discharging experiments were performed on these batteries under the conditions of a constant charging and discharging current of 0.5 mA/cm$^2$ and a charging and discharging voltage ranging from 4.2 V to 3.0 V. The results of the experiments are shown in FIG. 4.

[Evaluation]

Battery "b" exhibited a large decrease in its capacity during the repetition of charging and discharging cycles, and the capacity after about 50 cycles became smaller than half of the initial value. Although Battery "c" exhibited a moderate decrease in its capacity during the repetition of the charging and discharging cycles as compared with that of Battery "b", the initial capacity was small as compared with the other two batteries.

In contrast to these, although Battery "a" of the present invention had a slightly small initial capacity as compared with Battery "b", it exhibited a very favorable charging and discharging cycle characteristics. The capacity of Battery "a" after being subjected to the charging and discharging of 100 cycles was maintained to 98% of its initial value.

From these results, it was appreciated that the battery produced in accordance with the present invention had a high discharging voltage, a high discharging capacity and an excellent charging and discharging cycle characteristics.

Further, although LiCoO$_2$ was used as the cathode active material, it is needless to say that an advantage similar to that of this example can be obtained with a case, to which the present invention is applied, of using any other cathode active material which has reversibility for the charging and discharging.

EXAMPLE 16

In this example, a description was made on a cathode active material whose starting materials had been incorporated with a whisker at the time of its synthesis. First, the starting materials for the cathode active material was mixed with some whisker, and then the mixture thus obtained was heated, thereby obtaining the cathode active material containing the whisker.

As the cathode active material, LiMn$_2$O$_4$ was selected in this example. As the whisker, potassium titanate whisker having a size of a mean diameter of 1 μm and a mean length of 10 μm was used.

First, Li$_2$CO$_3$ and MnO$_2$, which were the starting materials for the cathode active material LiMn$_2$O$_4$, were thoroughly mixed together in a predetermined stoichiometric ratio. The mixture thus obtained was then heated at respective temperatures listed in Table 14 below. The heated mixture was then pulverized and sieved to have a particle size of 100 mesh or finer.

The cathode mixture was obtained by adding 2.0 g of graphite as the conductive agent and 3.0 g of polytetrafluoroethylene powder as the binding agent to 100 g of the cathode active material which had been incorporated with the whisker. The obtained cathode mixture was formed into a disk having a diameter of 17.5 mm to give the cathode, with an application of pressure of 1 ton/cm$^2$.

Using these cathodes, test cells each having a configuration similar to those in Example 9 were produced, and subjected to the charging and discharging cycle tests under the conditions similar to those in Example 9.

Table 14 summarizes discharge capacities of the respective cells per one gram of the cathode active material in the first cycle, and discharge capacities and capacity maintenance rates in the 100th cycle.

TABLE 14

| No. | Heating temperature (°C.) | Discharge capacity in the 1st cycle (mAh/g) | Discharge capacity in the 100th cycle (mAh/g) | Capacity maintenance rate in the 100th cycle (%) |
| --- | --- | --- | --- | --- |
| 16.1 | 300 | 100 | 44 | 40 |
| 16.2 | 400 | 110 | 105 | 95 |
| 16.3 | 600 | 115 | 110 | 96 |
| 16.4 | 800 | 120 | 119 | 99 |
| 16.5 | 1000 | 120 | 120 | 100 |
| 16.6 | 1200 | 120 | 120 | 100 |
| 16.7 | 1400 | 110 | 109 | 99 |
| 16.8 | 1600 | 110 | 44 | 40 |
| 16.9 | No whisker (comparative example) | 115 | 29 | 25 |
| 16.10 | Simple addition of whisker (comparative example) | 120 | 102 | 85 |

From the results shown in Table 14, it was appreciated that it was desirable to employ a temperature ranging from 400° C. to 1400° C., which brought a large initial capacity and a high capacity maintenance rate in the 100th cycle.

In contrast to this, the comparative example No.16.9 of no whisker addition had a large initial capacity but however had a remarkably small capacity maintenance rate in the 100th cycle. The cathode active material in the other comparative example No.16.10 was produced by simple addition of the whisker to the already finished active material LiMn$_2$O$_4$ and exhibited the high values in both the initial capacity and the cycle capacity maintenance rate. It was appreciated that the test cells Nos.16.2–16.7 of this example were more excellent in the cycle capacity maintenance rate than the test cell No.16.10.

A heating temperature lower than 400° C. resulted in a small capacity. It is believed that the small capacity was attributable to an insufficient growth of the crystal structure of the cathode active material. On the other hand, when the heating temperature is higher than 1400° C., a thermal decomposition of the whisker was remarkably proceeded and the thus decomposed whisker was unable to perform the inherent structure-maintaining function, thereby worsening the capacity maintenance rate.

A similar investigation was also made on silicon carbide whisker, silicon nitride whisker or aluminum borate whisker in place of potassium titanate whisker. As a result, it was confirmed that the preferable heating temperature was in a range between 400° C. and 1400° C., in either of these cases.

It was further confirmed that a similarly preferable capacity maintenance rate was obtained with the whisker whose surface was coated with titanium, aluminum, stainless steel or carbon.

Although metal lithium was used as the anode for combining with the above-mentioned cathode of the examples 9–16, it is needless to say that a similar advantage can be obtained with any anode capable of reversibly being charged and discharged. As suitable anode active materials, there are exemplified a carbon material, a graphite material or a metal oxide.

In the foregoing embodiments, the present invention had solely been applied to either of the anode or the cathode, and investigations had been made on the performance of one of the electrodes. It is however needless to say that it is preferable to configure a secondary battery by combining the anode and cathode both produced in accordance with the present invention.

In addition, although the electrolyte specified in each of the examples was used in each of the foregoing embodiments, it is possible to use a non-aqueous electrolyte containing a lithium salt, which is well known in this field of art. Lithium perchlorate, lithium hexafluorophosphate, lithium trifluoromethan sulfonate, lithium fluoroborate and the like can be exemplified as solute for such electrolyte. Carbonates such as propylene carbonate and ethylene carbonate, esters such as γ-butyrolactone and methyl acetate, ethers such as dimethoxyethane and tetrahydrofran, and the like can be exemplified as solvent.

Although the present invention has been described in terms of the presently preferred embodiments, it is to be understood that such disclosure is not to be interpreted as limiting. Various alterations and modification will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrode as an anode or a cathode of a non-aqueous electrolyte secondary battery comprising a solid structural body of a mixture including:
    an active material which is capable of reversibly intercalating and deintercalating lithium;
    a whisker which is chemically and electrochemically inert said whisker is selected from the group consisting of silicon carbide whisker, silicon nitride whisker, potassium titanate whisker, aluminum borate whisker, and mixtures thereof; and
    a binding agent.

2. An electrode in accordance with claim 1, wherein said active material is an anode active material, and a surface of said whisker is coated with at least one substance selected from the group consisting of carbon, nickel, copper and stainless steel.

3. An electrode in accordance with claim 1, wherein said active material is a cathode active material, and a surface of said whisker is coated with at least one substance selected from the group consisting of carbon, titanium, aluminum and stainless steel.

4. An electrode in accordance with claim 1, wherein said whisker has a mean diameter of from 0.1 μm to 3 μm, and a mean length of from 3 μm to 50 μm.

5. An electrode in accordance with claim 1, wherein said active material is a carbon material.

6. An electrode in accordance with claim 1, wherein said active material is at least one selected from the group consisting of $LiCoO_2$, $LiMn_2O_4$, $LiNiO_2$, $LiFeO_2$, $\gamma$-$LiV_2O_5$, $MnO_2$, $TiS_2$, $MoS_2$, $V_2O_5$ and $V_6O_{13}$.

7. An electrode in accordance with claim 2, wherein said whisker has a mean diameter of from 0.1 μm to 3 μm, and a mean length of from 3 μm to 50 μm.

8. An electrode in accordance with claim 2, wherein said active material is a carbon material.

9. An electrode in accordance with claim 3, wherein said whisker has a mean diameter of from 0.1 μm to 3 μm, and a mean length of from 3 μm to 50 μm.

10. An electrode in accordance with claim 3, wherein said active material is at least one selected from the group consisting of $LiCoO_2$, $LiMn_2O_4$, $LiNiO_2$, $LiFeO_2$, $\gamma$-$LiV_2O_5$, $MnO_2$, $TiS_2$, $MoS_2$, $V_2O_5$ and $V_6O_{13}$.

11. An electrode in accordance with claim 4, wherein a content of said whisker is 0.5–20% by weight of said active material.

12. An electrode in accordance with claim 7, wherein a content of said whisker is 0.5–20% by weight of said active material.

13. An electrode in accordance with claim 9, wherein a content of said whisker is 0.5–20% by weight of said active material.

14. An anode in accordance with claim 5 or 8, wherein said carbon material is synthesized in the coexistence of said whisker.

15. A cathode in accordance with claim 6 or 10 wherein said active material is synthesized in the coexistence of said whisker.

16. A non-aqueous electrolyte secondary battery comprising
    a cathode and an anode which have reversibility for charging and discharging, and
    a non-aqueous electrolyte including a lithium salt;
    wherein said anode constitutes a solid structural body including:
        a carbon material being capable of reversibly intercalating and deintercalating lithium,
        a whisker which is chemically and electrochemically inert and at least one selected from the group consisting of silicon carbide whisker, silicon nitride whisker, potassium titanate whisker and aluminum borate whisker, and
        a binding agent.

17. A non-aqueous electrolyte secondary battery comprising
    a cathode and an anode which have reversibility for charging and discharging, and
    a non-aqueous electrolyte including a lithium salt;
    wherein said cathode constitutes a solid structural body including:
        a cathode active material of at least one selected from the group consisting of $LiCoO_2$, $LiMn_2O_4$, $LiNiO_2$, $LiFeO_2$, $\gamma$-$LiV$ 205, $MnO_2$, $TiS_2$, $MoS_2$, $V_2O_5$ and $V_6O_{13}$,
        a whisker which is chemically and electrochemically inert and is at least one selected from the group consisting of silicon carbide whisker, silicon nitride whisker, potassium titanate whisker and aluminum borate whisker, and
        a binding agent.

* * * * *